US009483741B2

(12) United States Patent
Sun et al.

(10) Patent No.: US 9,483,741 B2
(45) Date of Patent: *Nov. 1, 2016

(54) RULE-BASED ITEM CLASSIFICATION

(71) Applicant: Wal-Mart Stores, Inc., Bentonville, AR (US)

(72) Inventors: Chong Sun, Redwood City, CA (US); Fan Yang, Redwood City, CA (US); Narasimhan Rampalli, Los Altos, CA (US); Digvijay Singh Lamba, Sunnyvale, CA (US); Jun Xie, San Jose, CA (US); Thomas E. Chivers, Santa Clara, CA (US); Gokul Kavaturi, Sunnyvale, CA (US); Tracy ThuTrang Phung, Foster City, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,351

(22) Filed: Aug. 29, 2014

(65) Prior Publication Data

US 2014/0372351 A1    Dec. 18, 2014

Related U.S. Application Data

(63) Continuation-in-part of application No. 13/852,884, filed on Mar. 28, 2013, now Pat. No. 9,390,378.

(51) Int. Cl.
| | |
|---|---|
| *G06N 99/00* | (2010.01) |
| *G06Q 10/10* | (2012.01) |
| *G06Q 50/00* | (2012.01) |
| *G06F 17/30* | (2006.01) |

(Continued)

(52) U.S. Cl.
CPC ....... *G06N 99/005* (2013.01); *G06F 17/30707* (2013.01); *G06K 9/626* (2013.01); *G06K 9/6292* (2013.01); *G06N 99/00* (2013.01); *G06Q 10/063* (2013.01); *G06Q 10/087* (2013.01); *G06Q 10/101* (2013.01); *G06Q 50/01* (2013.01)

(58) Field of Classification Search
CPC .................................................. G06N 99/005
See application file for complete search history.

(56) References Cited

U.S. PATENT DOCUMENTS

| | | |
|---|---|---|
| 5,950,173 A | 9/1999 | Perkowski |
| 6,751,600 B1 | 6/2004 | Wolin |

(Continued)

FOREIGN PATENT DOCUMENTS

| | | |
|---|---|---|
| WO | 2013184383 | 12/2013 |
| WO | 2014063157 | 4/2014 |

OTHER PUBLICATIONS

F. Sebastiani "Machine Learning in Automated Text Categorization", ACM computing surveys (CSUR), 34.1, 2002, pp. 1-47.*

(Continued)

*Primary Examiner* — Vincent Gonzales
(74) *Attorney, Agent, or Firm* — Bryan Cave LLP

(57) ABSTRACT

Systems and methods are disclosed herein for rule-based item classification. The methods include receiving, by a computing device, an item record for analysis. The computing device may determine ranked lists of item types using rule-based classifiers and machine learning-based classifiers. Then, the computing device may aggregate the ranked lists of item types to generate a combined ranked list of item types.

20 Claims, 8 Drawing Sheets

(51) Int. Cl.
*G06K 9/62* (2006.01)
*G06Q 10/06* (2012.01)
*G06Q 10/08* (2012.01)

(56) References Cited

U.S. PATENT DOCUMENTS

| | | | |
|---|---|---|---|
| 7,672,877 | B1 | 3/2010 | Acton |
| 7,739,203 | B2 | 6/2010 | Kettner |
| 7,870,039 | B1 | 1/2011 | Dom |
| 8,036,945 | B2 | 10/2011 | Speers |
| 8,271,495 | B1 | 9/2012 | Skrenta |
| 8,275,765 | B2 | 9/2012 | Li |
| 8,392,281 | B1 | 3/2013 | Bashir |
| 8,510,307 | B1 | 8/2013 | Touloumtzis |
| 8,572,013 | B1 | 10/2013 | Nash |
| 8,583,645 | B2 | 11/2013 | Treece |
| 2005/0028109 | A1 | 2/2005 | Richards |
| 2008/0070223 | A1 | 3/2008 | Lofkrantz |
| 2008/0082519 | A1 | 4/2008 | Zentner |
| 2008/0097843 | A1 | 4/2008 | Menon |
| 2009/0210325 | A1 | 8/2009 | Borom |
| 2010/0070345 | A1 | 3/2010 | Abelow |
| 2011/0225161 | A1 | 9/2011 | Zhong |
| 2012/0005222 | A1 | 1/2012 | Bhagwan |
| 2012/0088220 | A1 | 4/2012 | Feng |
| 2012/0095828 | A1 | 4/2012 | Evanovich |
| 2012/0166441 | A1 | 6/2012 | Karidi |
| 2012/0278825 | A1 | 11/2012 | Tran |
| 2012/0316889 | A1 | 12/2012 | Carmel |
| 2013/0066961 | A1 | 3/2013 | Naik |
| 2013/0144813 | A1 | 6/2013 | Sengupta |
| 2013/0144949 | A1 | 6/2013 | Mitchell, Jr. |
| 2013/0204652 | A1 | 8/2013 | Marins |
| 2013/0204754 | A1 | 8/2013 | Brelig |
| 2013/0254181 | A1* | 9/2013 | Balassanian ...... G06F 17/30864 707/709 |
| 2013/0290172 | A1 | 10/2013 | Mashinsky |
| 2014/0058804 | A1 | 2/2014 | Zhou |
| 2014/0129378 | A1 | 5/2014 | Richardson |
| 2014/0214632 | A1 | 7/2014 | Garera |

OTHER PUBLICATIONS

L Si and J. Callan, "A Semisupervised Learning Method to Merge Search Engine Results", ACM Trans. on Info. Sys. 21.4, Oct. 2003, pp. 457-491.*

X. Zhu, "Semi-Supervised Learning Survey", Technical Report, Univ. of Wisc., Dept. of Computer Sciences, No. 1530, Dec. 2007, 59 pages.*

J. Costa et al., "On Using Crowdsourcing and Active Learning to Improve Classification Performance", Intelligent Systems Design and Applications (ISDA), 2011 11th International Conference on. IEEE, pp. 469-475.

A. Gupta et al. "mCleark: Enabling Mobile Crowdsourcing in Developing Regions", CHI 2012, May 5-10, 2012, pp. 1843-1852.

D. Karampinas and P. Triantafillou, "Crowdsourcing Taxonomies", ACM Extended Semantic Web Conference 2012, pp. 545-559.

* cited by examiner

FIG. 6

RULE-BASED ITEM CLASSIFICATION

CROSS REFERENCE TO RELATED PATENT APPLICATIONS

This application claims is a continuation-in-part of Ser. No. 13/852,884, filed Mar. 28, 2013, entitled "System And Method For High Accuracy Product Classification With Limited Supervision."

TECHNICAL FIELD

The present disclosure relates to systems and methods for classification of large amounts of documents and other data.

BACKGROUND

Many attempts have been made to automatically classify documents or otherwise identify the subject matter of a document. In particular, search engines seek to identify documents that are relevant to the terms of a search query based on determinations of the subject matter of the identified documents. Another area in which classification of documents is important is in the area of product-related documents such as product descriptions, product reviews, or other product-related content. The number of products available for sale constantly increases and the number of documents relating to a particular product is further augmented by social media posts relating to products and other content.

Although some automatic classification methods are quite accurate, they are not a substitute for human judgment. Often documents identified or classified using automated methods are completely irrelevant. In addition, these methods are subject to manipulation by "spammers" who manipulate the word usage of content to obtain a desired classification but provide no useful content.

Of course, for a large volume of content, human classification of documents is not practical. The systems and methods described herein provide improved methods for incorporating both automated classification and human judgment in a highly effective manner.

BRIEF DESCRIPTION OF THE DRAWINGS

In order that the advantages of the present disclosure will be readily understood, a more particular description of the present disclosure will be rendered by reference to specific embodiments illustrated in the appended drawings. Understanding that these drawings depict only typical embodiments of the present disclosure and are not therefore to be considered limiting of its scope, the present disclosure will be described and explained with additional specificity and detail through use of the accompanying drawings, in which:

FIG. 6 is a sample question to a crowdsourcing computer network for evaluation;

DETAILED DESCRIPTION

Figure 1:
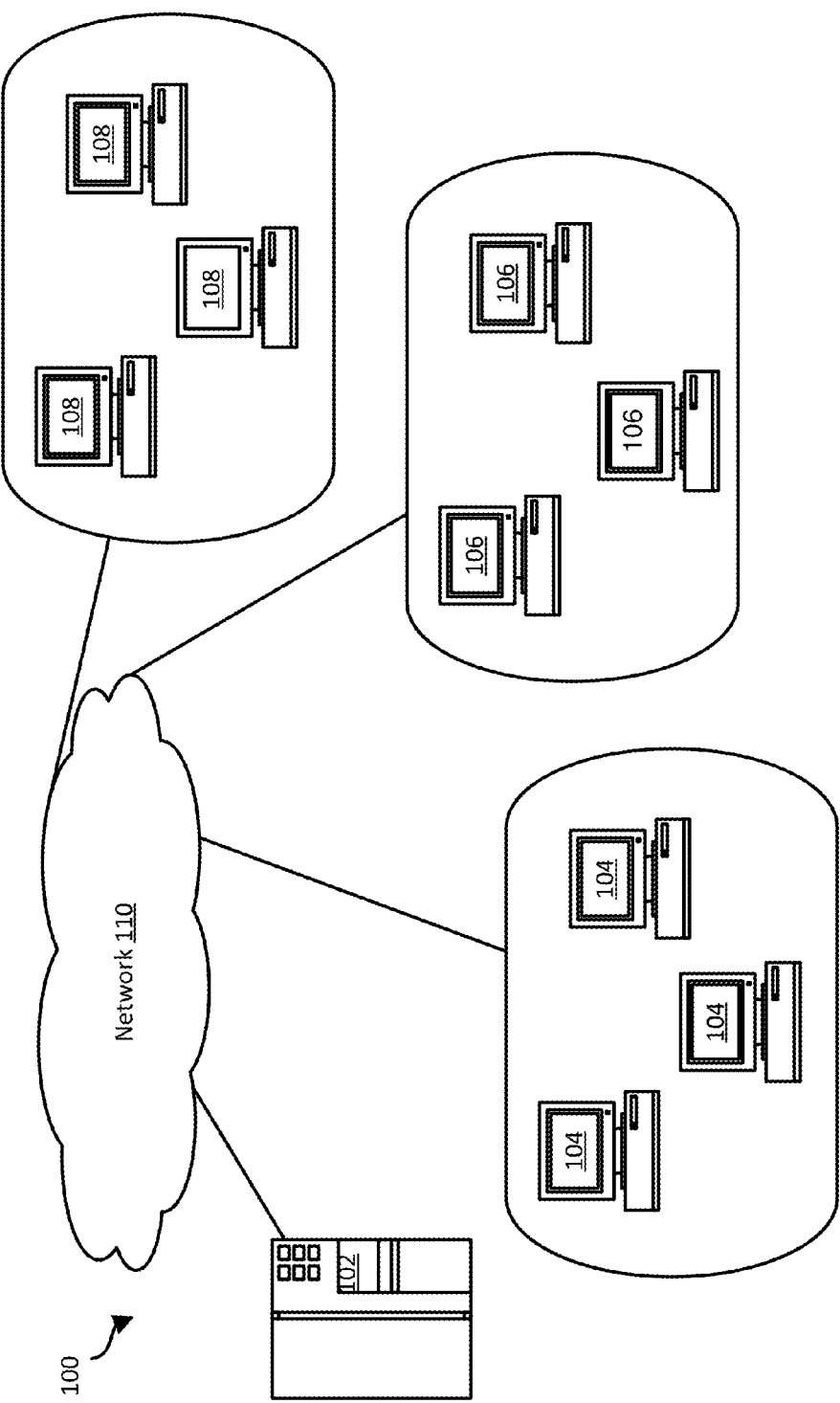
FIG. 1 is a schematic block diagram of a system for performing methods in accordance with embodiments of the present disclosure.

It will be readily understood that the components of the present disclosure, as generally described and illustrated in the Figures herein, could be arranged and designed in a wide variety of different configurations. Thus, the following more detailed description of the embodiments of the present disclosure, as represented in the Figures, is not intended to limit the scope of the present disclosure, as claimed, but is merely representative of certain examples of presently contemplated embodiments in accordance with the present disclosure. The presently described embodiments will be best understood by reference to the drawings, wherein like parts are designated by like numerals throughout.

The present disclosure has been developed in response to the present state of the art and, in particular, in response to the problems and needs in the art that have not yet been fully solved by currently available apparatus and methods.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Any combination of one or more computer-usable or computer-readable media may be utilized. For example, a non-transitory computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present disclosure may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a system 100 in which methods described hereinbelow may be implemented. The system 100 may include one or more server systems 102 that may each be embodied as one or more server computers each including one or more processors that are in data communication with one another. The server system 102 may be in data communication with one or more analyst workstations 104 and one or more crowdsourcing workstations 106. In the methods disclosed herein, the analyst workstations 104 and crowdsourcing workstations 106 may be embodied as mobile devices such as desktop computers or other computing device such as a mobile phone or tablet computer. The methods disclosed herein may also be implemented with another population of users and corresponding merchant workstations 108 for making modifications to product records as prompted according to methods disclosed herein.

In some embodiments, some or all of the methods disclosed herein may be performed using a desktop computer or any other computing device as the analyst workstations 104, crowdsourcing workstations 106, and merchant workstations 108. For purposes of this disclosure, discussion of communication with a user or entity or activity performed by the user or entity (e.g. analyst, crowdsourcing community, merchant) may be interpreted as communication with a computer 104, 106, 108 associated with the user or entity or activity taking place on a computer associated with the user or entity. The analyst workstations 104, crowdsourcing workstations 106, and merchant workstations 108, may be viewed as an analyst computer network 104, crowdsourcing computer network 106, and merchant computer network 108 whereby tasks to be performed by one of these populations may be assigned to any member of the population by means of logic implemented by any of these computer networks, the server system 102, or some other entity.

Some or all of the server 102, analyst computers 104, crowdsourcing workstations 106, and merchant workstations 108 may communicate with one another by means of a network 110. The network 110 may be embodied as a peer-to-peer connection between devices, a connection through a local area network (LAN), WiFi network, the Internet, or any other communication medium or system. Each of the populations 104, 106, 108 of workstations may be coupled to one another by separate networks some or all of the three populations 104, 106, 108 of workstations may share a common network.

The server system 102 may be associated with a merchant, or other entity, providing classification services of documents. For example, the server system 102 may host a search engine or a site hosted by a merchant to provide access to information about products and user opinions about products. The server system 102 may additionally or alternatively implement a social networking site that enables the generation of content by a user. For example, the server system 102 may store, provide access to, or enable generation of, social media content for a site such as Facebook™, Twitter™, FourSquare™, LinedIn™, or other social networking or blogging site that enables the posting of content by users.

Figure 2:
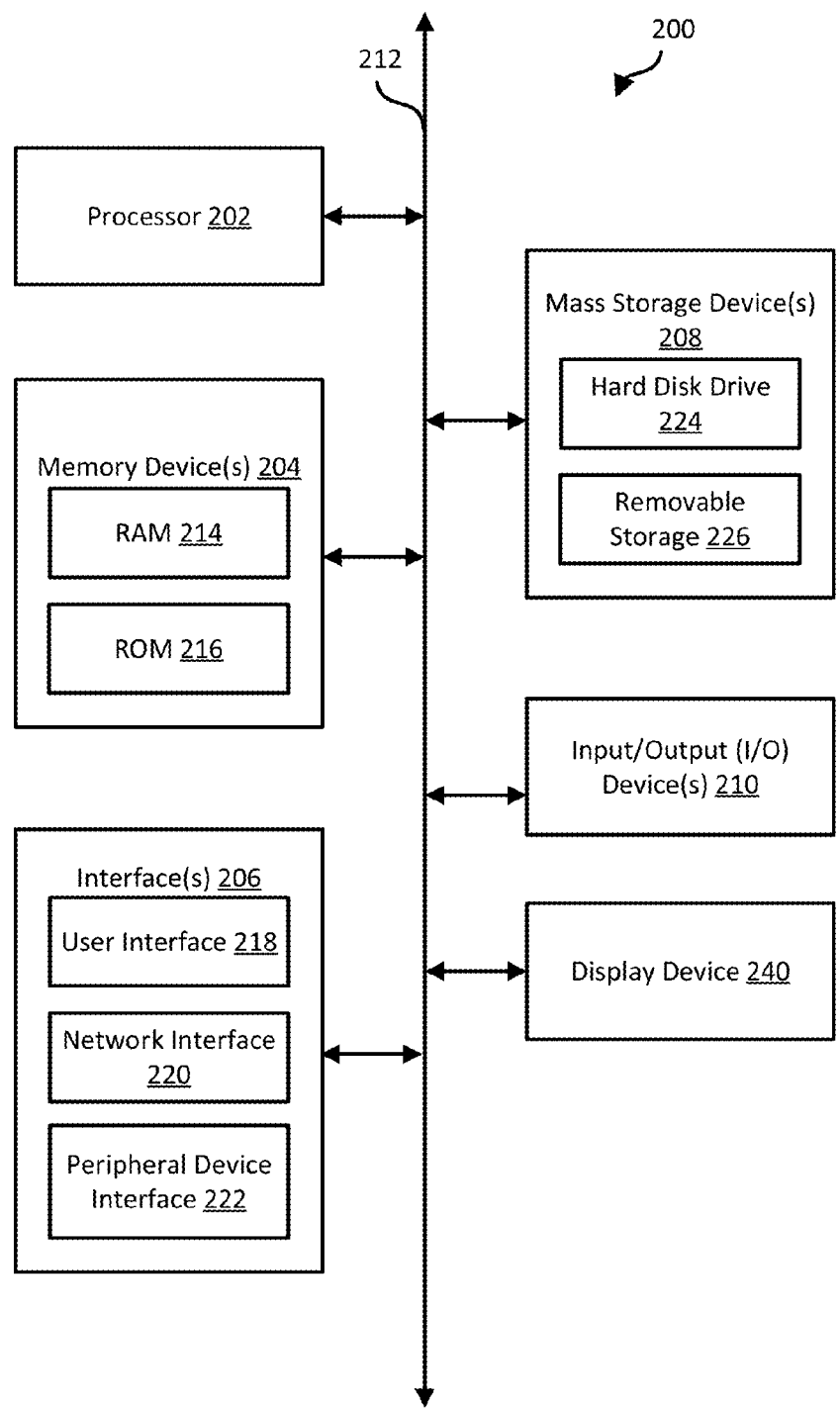
FIG. 2 is a block diagram of a computing device suitable for implementing embodiments of the present disclosure.

FIG. 2 is a block diagram illustrating an example computing device 200. Computing device 200 may be used to perform various procedures, such as those discussed herein. A server system 102, analyst workstation 104, crowdsourcing workstation 106, and merchant workstations 108, may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
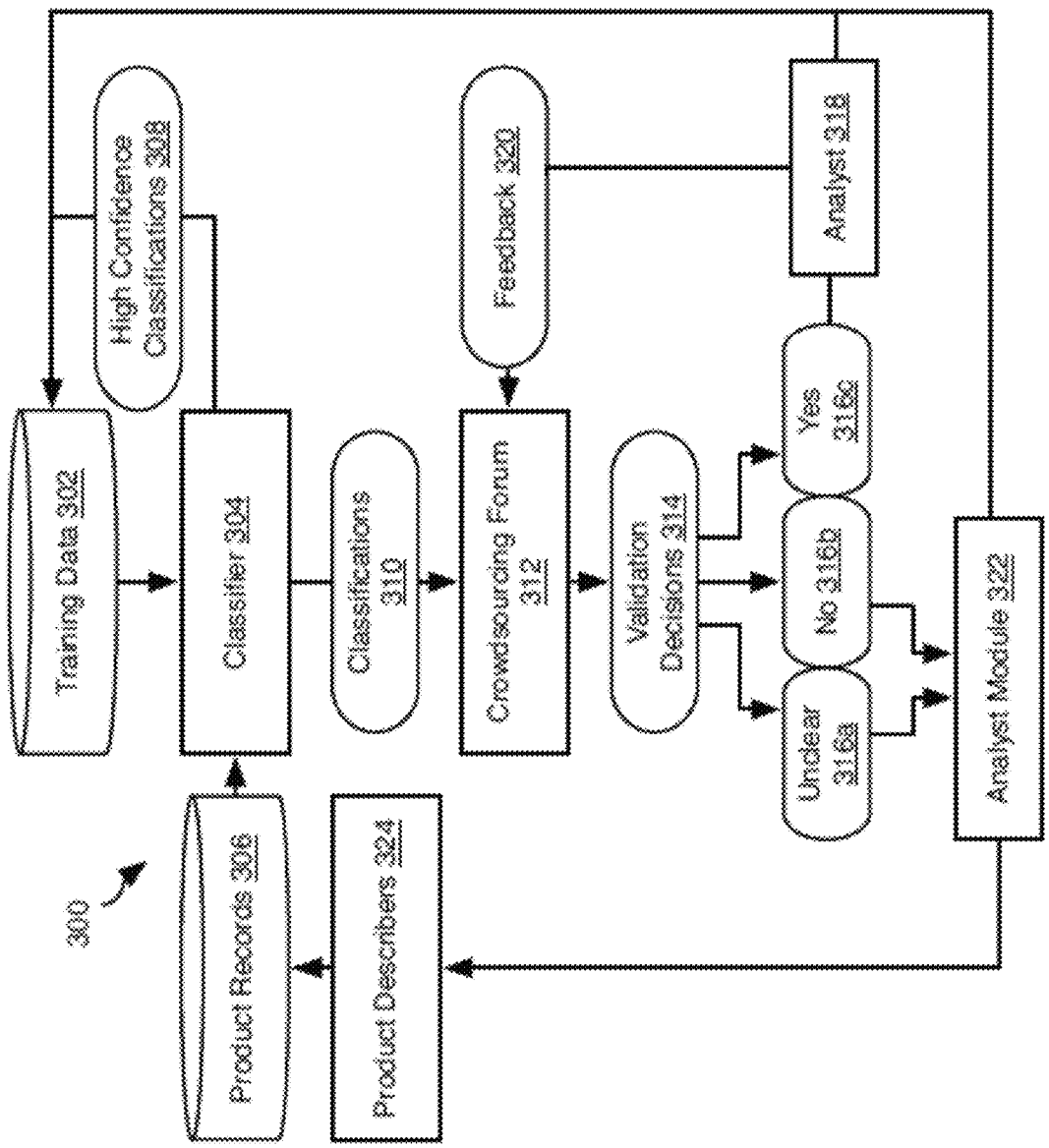
FIG. 3 is a schematic block diagram of modules implementing methods in accordance with embodiments of the present disclosure.

FIG. 3 illustrates a system 300 of software and/or hardware modules implementing classification methods disclosed herein. In some embodiments, the modules and data of the system 300 are implemented or accessed by the server system 102 or some other entity that provides an interface to the server system 102. The system 300 includes training data 302, such as stored in a database. The training data 302 may include various data values used to train a classification model. For example, the training data 302 may include entries of the form [text]->[classification value], where text is text that might form all or part of a record analyzed or a field of a record analyzed. The methods disclosed herein may advantageously be used when classifying products according to a product name or product record. Accordingly, text may include a product name or some or all of a product record for a product that has been classified either according to human judgment or according to an automated method that indicates with high confidence that [text] corresponds unambiguously to [classification value]. As will be described in greater detail below, entries may be added to the training data 302 over time.

The training data is input to a classifier 304. The classifier 304 may include executable and operational functions and data structures defining a machine learning algorithm and the state of a machine learning model. The particular machine learning algorithm used to implement the classifier 304 may include any machine learning algorithm known in the art, including, for example, a supervised or unsupervised learning algorithm, active learning algorithm, or the like. The classifier 304 creates or updates its state in response to the training data 302. The classifier 304 may then classify one or more records according to its state, such as product records 306 or some other records. The output of the classifier 304 may be entries similar to the training data, e.g. [text]->[classification value] pairings, where text is some or all of the text of a product record 306 and classification is a classification assigned by the classifier 304 according to the state of the classifier 304 as trained according to training data 302.

As known in the art of machine learning, decisions made by the algorithm, e.g. a classification of text, may be assigned a confidence score indicating how much support exists for the decision. Using this confidence score, classifications output by the classifier may be divided into high confidence classifications 308 and other classifications 310. For example, where resources for implementing the methods disclosed herein are limited, the number of classifications 310 selected for processing may be chosen in accordance with this capacity. For example, the M classifications with the lowest score may be processed as classifications 310 with the remainder treated as high confidence classifications 308. In other embodiments, a threshold for the confidence score may be chosen such that X percent of the classifications have a score below the threshold and are used as classifications 310.

In some embodiments, the classifications 310 and classifications 308 may include less than all classifications in a given iteration of the methods disclosed herein, such that only data with a confidence score above a first threshold are deemed high confidence classifications 308 and only classifications with a confidence below a second threshold are deemed classifications 310, where the second threshold is below the first threshold and a nonzero quantity of classifications have confidence scores between the first and second thresholds.

In some embodiments, the high confidence classifications 308 are added to the training data 302. In other embodiments the high confidence classifications 308 may be ignored for purposes of the methods disclosed herein. The high confidence data 308 may be used for other purposes, such as for responding to search queries or any other application in which an accurate classification of a record is of interest.

The classifications 310 may then be submitting to a crowdsourcing forum 312, such as to crowdsourcing workstations 306. The crowdsourcing forum 312 may implement logic for distributing tasks to individuals associated with the forum, receiving responses, and returning responses to a requesting entity. The crowdsourcing forum 312 may be implemented or hosted by a server system 102 or a server system owned or controlled by a different entity providing crowdsourcing services.

The crowdsourcing forum 312 may return, for some or all of the classifications 310, a validation decision 314. In some embodiments, for some or all of the classifications 310, the crowdsourcing forum 312 may return a yes or no response indicating that the classifications was or was not correct. In some embodiments, the crowdsourcing forum may also include a substitute classification for some or all of the classifications indicated as incorrect. In some embodiments, the crowdsourcing forum 312 may return an "unclear" response indicating that the [text] in a [text]-[classification value] output of the classifier is insufficient to accurately judge whether the classification is correct and/or what an accurate classification should be.

The unclear classifications 316a, invalid classifications 316b, and valid classifications 316c may be further processed. For example, the classifications 316c designated as valid by the crowdsourcing forum 312 may be added to the training data 302. Where a substitute classification has been supplied for an invalid 316b classification, the record and the substitute classification may also be added to the training data 302.

The valid classifications 316c, and possibly one or both of the unclear classifications 316a and invalid classifications 316b, may be submitted to analysts 318. The analysts 318 may then provide feedback 320 to the crowdsourcing forum. Submitting the some or all of the validation decisions 314 to the analysts 318 may include transmitting the validation decision to an analyst workstation 104 and displaying a prompt or interface on the analyst workstation to receive an evaluation of the correctness of the validation decision. The validation decisions may also be retrieved by one or more analyst workstations 104 either automatically or upon receiving an instruction by the analyst workstation 104 to retrieve a portion of the validation decisions 314 for review. For example, a random sampling of the validations decisions 314 may be selected for review. In some embodiments, samples of validation decisions 314 selected for review by the analyst 318 may be selected by category. For example, validation decisions 314 with respect to classifications including a particular classifier in the [classification value] field or a [classification value] belonging to a particular category may all be selected for review or sampled for review.

Feedback received from an analyst, such as input to an interface on an analyst computer 104, may include an indicator of whether a particular validation decision 314 was incorrect. Those validation decisions 314 found to be incorrect by the analyst 318 may be transmitted to the crowdsourcing forum 312. The feedback 320 may include some or all of an indication that a decision 314 was incorrect, a substitute classification from the analyst 318, the validation decision 314 (valid, invalid, unclear), a substitute classification of the validation decision 314 provided by the crowd sourcing forum 312, and the original classification 310 corresponding to the validation decision 314. A validation decision 314 may have an identifier associated therewith that identifies the individual participant in the crowdsourcing forum 312 that generated the decision 314. Accordingly, the feedback 320 for a validation decision 314 may include this identifier. The crowdsourcing forum 312 may then use this information to route the feedback 320 to the appropriate participant, e.g. a crowdsourcing workstation 106 operated by the participant. In other embodiments, each validation decision 314 may have a unique identifier that is used by the crowdsourcing forum 312 to route the feedback to the appropriate participant according to a record of past assignments of tasks.

Validation decisions 316c that have been received from the crowdsourcing forum 312, including those corrected or validated by analysts 318, may also be used as high-accuracy data for other purposes, such as responding to queries by users or any other method that can advantageously use accurately classified data. Accordingly, high confidence classifications 308 and the classifications corresponding to positive validation decisions 316c may be added to a production data set that is used for responding to queries or other requests for a classification associated with a product record.

In some embodiments, one or both of the unclear validation decisions 316a and invalid 316b validation decisions may be transmitted to an analyst module 322, that may interface with the same or different individuals or computing devices as the analysts 318. The analyst module 322 may be programmed to select classification values, i.e. values for the [classification value] fields of the classifications 310 for which additional training data is needed. The classification values may be selected individually or as a group. For example, a category of a taxonomy having one or more classification values as descendants thereof may be selected by the analyst module 322 for the generation of training data. A category of a taxonomy selected by the analyst module 322 may also have descendent sub-categories as well as individual classification values as descendants in the taxonomy.

An analyst module 322 may select classification values or categories of classification values on the basis on a percentage of classifications 310 referencing that classification value or category of classification values that were marked as invalid, or either invalid or unclear, by the crowdsourcing forum 312. The analyst module 322 then generates prompts that may be transmitted and/or displayed to analysts, e.g. analyst workstations 104, to generate additional training data when appropriate.

In some embodiments, classification values or categories of classification values may be selected based on a percentage of classifications 310 referencing that classification value or category of classifications that were marked as either invalid or unclear. For an individual classification value, a simple percentage threshold may be used: where X percent or more of the classifications 310 including that classification value were found to be invalid (or either invalid or unclear), then a prompt will be issued to generate training data relating to that classification value.

For a category of classification values, a raw percentage of classifications 310 including a classification value belonging to that category may be compared to a threshold and, if this percentage is above the threshold, a prompt may be issued to generated training data relating to that category. In other embodiments, the percentage of classification values belonging to the category that individually have a percentage of invalid classifications above a first threshold may be identified. The percentage of classification values belonging to the category that exceed the first threshold may be compared to a second threshold. Where the number of classification values exceeding the first threshold exceeds this second threshold, a prompt may be generated that instructs one or more analysts to generate training data relating to that category.

A prompt to generate training data may include the classification value or category for which training data is needed, some or all of the classifications 310 relating to the classification value or category included in the prompt, records that were improperly associated with the classification value or category by the classifier 304, records that were correctly associated with the classification value or category (e.g. as validated by the crowdsourcing forum 312), and other information.

Actual records used to generate training data ([text]-> [classification value] entries) may be selected by analysts from a static pool of records, such as the product records 306 of a product catalog or may be retrieved from another source or generated by the analyst. The selection and location of records may be a manual process of research and analysis according to human judgment. In some embodiments, to facilitate this process, records may be suggested by the analyst module 322. For example, where a first classification value is identified as in need of training data as described above, records incorrectly classified with other classification values belonging to the same category or subcategory as the first classification value in a taxonomy may be identified and transmitted for display on an analyst workstation 104 inasmuch as it is possible that the first classification value would be appropriate for some of these records.

In some embodiments, one or more records may be transmitted by the analyst module 322 to one or more product describers 324 (e.g. a merchant computer 108) with a request to add more descriptive data to the one or more records. In some embodiments, all records for unclear 316a validation decisions may be automatically transmitted to the product describers 324. In some embodiments, other records corresponding to the invalid decisions 316b may be transmitted to the product describers 324 in response to an instruction received from an analyst, such as from an analyst workstation 104. The decision to transmit the instruction may be according to human judgment. In some embodiments, an analyst may issue an instruction to the product describers 324 to reduce the amount of information in a record, for example by inputting an instruction to an analyst workstation 104 that then transmits the instruction to a merchant workstation 108. The instruction may include a record, identifier of a record, or an identifier for a category of records, and one or more words or classes of words that should be omitted from the identified record or records. Upon receiving such an instruction, a product describe 324 may input modifications to one or more product records using a merchant workstation 108, which then invokes addition of the modified records to the product record database 306.

Figure 4:
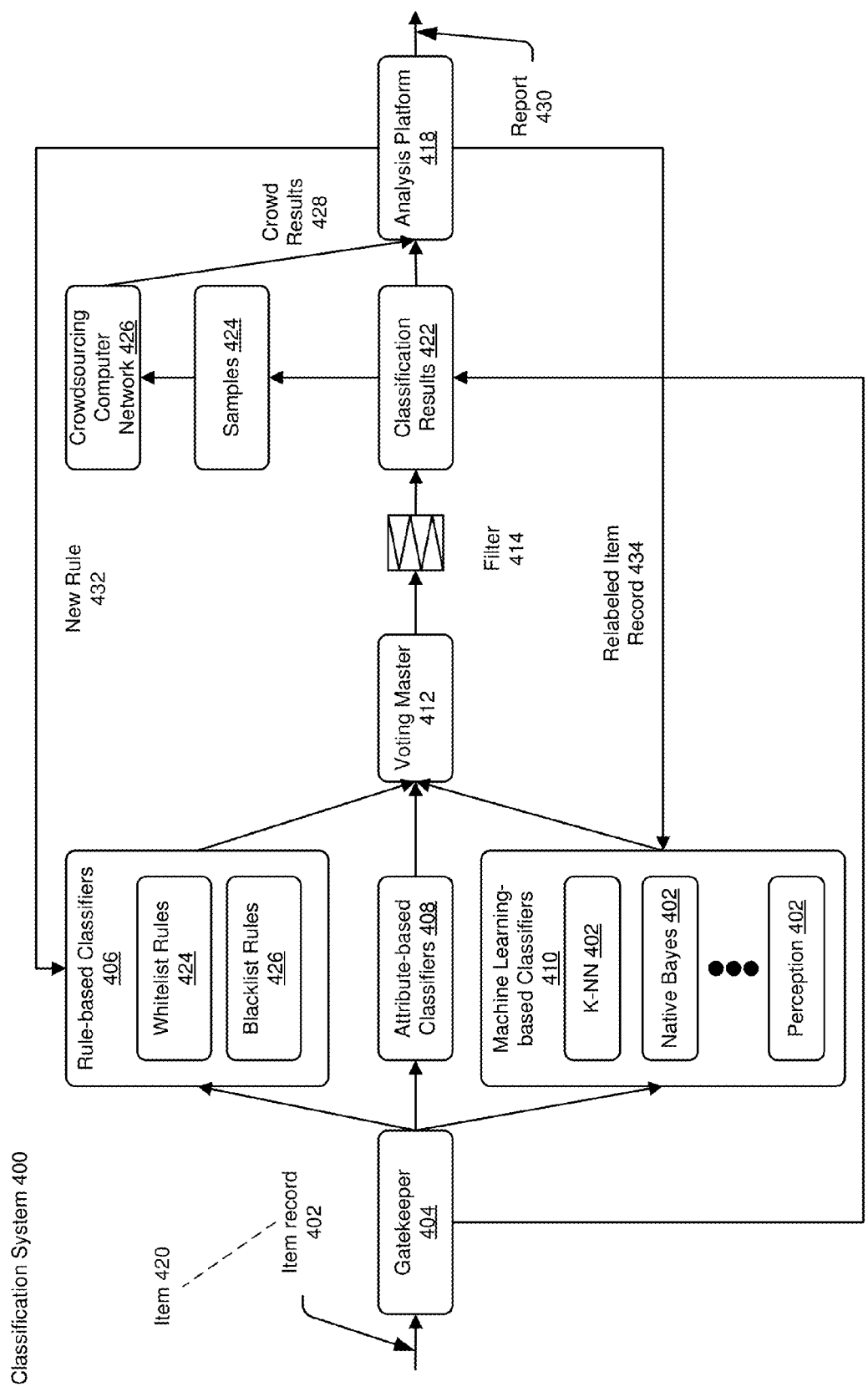
FIG. 4 is another schematic block diagram of modules implementing methods in accordance with embodiments of the present disclosure.

FIG. 4 is another schematic block diagram of modules of a classification system 400 implementing methods in accordance with embodiments of the present disclosure. Classification system 400 may use a combination of machine learning, rules, developers, analysts, and crowd workers to form a solution that continuously classifies items and/or improves the item classification over time. For example, item classification may include various means of classifying items with respect to item groups (e.g., item types), and an item may belong to an item group. Item classification generally group items together for, for example, searches so that it will be easier for users and/or customers to find desired items. An item classification on a particular item may be evaluated and/or labeled by associating the item classification with a confidence score, which may indicate the likelihood as being a correct item category.

In some embodiments, item type may refer to a group of items sharing the same or similar features, and may be determined using an item taxonomy. In some embodiments, the item type may be a node (e.g., a category) of a taxonomy, which may be built and/or maintain using various methods, such as automatic, outsourcing, and crowdsourcing methods. In some embodiments, an item may belong to an item type of the taxonomy. For example, the taxonomy may include multiple mutually exclusive item types, such as "laptop computers", "area rugs", "laptop bags & cases", "dining chairs", "decorative pillows", "rings". The taxonomy may be constantly being updated, with nodes being deleted, merged, modified, and new nodes being created all the time. Consequently, the set of item types may be constantly changed.

An item record (e.g., an item record 402) may include a description of an item. The item record may include a record of attribute-value pairs. As illustrated below, three item records are described in a JavaScript Object Notation (JSON) format:

{
"Item ID": 30427934,
"Title": "Eastern Weavers Rugs EYEBALLWH-8×10 Shag Eyeball White 8×10 Rug",
"Description": "Primary Color: White-Secondary Color: White-Construction: Hand Woven-Material: Felted Wool-Pile Height: 1"- Style: Shag SKU: EASW1957"
}
{
"Item ID": 31962310,
"Title": "1-⅜ Carat T.G.W. Created White Sapphire and ¼ Carat T.W. Diamond 10 Carat White Gold Engagement Ring",
"Description": "As a sincere declaration of devotion, this gorgeous Created White Sapphire and Diamond Engagement Ring is fashioned in lustrous white gold. The engagement ring showcases a stunning created white sapphire at its center and a total of 24 round, pave-set diamonds along the top and sides of the rib-detailed band."
}
{
"Item ID": 17673919,
"Title":"Royce Leather Ladies Leather Laptop Briefcase",
"Description":"This handy ladies laptop brief has three zippered compartments. The first on the front is a deep pocket with a tucked-in hidden zipper. The second compartment has multiple interior pockets for a Blackberry/Palm Pilot, cell phone, business cards, credit cards, pen loops and much more. The final compartment is divided to hold laptop computer and files all in one location. Topped off with two handles and a comfortable shoulder strap."
}

As illustrated in the above examples, item records may have description attributes (e.g., "Item ID" and "Title"). In some embodiments, item records may include other attributes (e.g., "Manufacturer", "Color"). Classification system 400 may receive multiple item records (e.g., millions) from one or more third parties (e.g., vendors). These third parties may or may not provide information more than a description of items. In some embodiments, items may be classified into item types based on the item records. For example, the three products in the examples above may be classified into the types "area rugs", "rings" and "laptop bags & cases," respectively.

Classification system 400 may be initialized using a basic set of training data and rules supplied by analysts. Given a set of incoming items, classification system 400 may classify them, and/or implement crowdsourcing to evaluate results and to flag incorrect results. Classification system 400 may also enable the analysts to examine the flagged cases, and to fix them by writing new rules, relabeling certain items, and alerting the developers associated with classification system 400. In these instances, the newly written rules and the relabeled items may be incorporated into classification system 400 such that the developers may update and/or improve the item classification using an underlying automatic algorithm. In some instances, for those items that classification system 400 fails or refuses to classify (e.g., low confidence score), classification system 400 may enable the analysts to examine them, then and to create rules as well as training data (i.e., relabeled items). For example, the newly created rules and training data may incorporated into classification system 400.

In some embodiments, classification system 400 may include a set of functionalities of hardware (e.g., computing devices) and/or software (e.g., programs) that pertain to the operation, administration, maintenance, and/or provisioning of item classification. Classification system 400 may include a server or a collection of servers in a distributed configuration (e.g., cloud computing service, server farm, etc.) or non-distributed configuration. Classification system 400 may include various components (e.g., modules) such as a gatekeeper 404, rule-based classifiers 406, attribute-based classifiers 408, machine learning-based classifiers 410, a voting master 412, a filter 414, a crowdsourcing computer network 416, and/or an analysis platform 418.

Classification system 400 may process the item record 402 after the initialization. For example, an incoming item (e.g., in Excel or JSON format) may be converted into a record of attribute-value pairs, and then be fed into gatekeeper 404. Gatekeeper 404 may determine whether at least one of the following conditions are met: (a) the title of an item 420 matches the title of an item (e.g., item Y) in the training data, and (b) a rule in gatekeeper 404 may classify item 420 with a confidence score higher than a predetermined threshold, or (c) the title of item 420 is empty. In a condition of (a) or (b), gatekeeper 404 sends item record 402 together with the appropriate item type to a result 422 for further processing. In the condition of (c), gatekeeper 404 may send item record 402 to classification results 422 without providing a recommended item type.

If none of these conditions is met, the gatekeeper 404 may send item record 402 to various item classifiers, such as rule-based classifiers 406, attribute-based classifiers 408, machine learning-based classifiers 410, etc. An item classifier may refer to one or more modules to exploit item information to predict the likelihood that an input item is associated with a given output item type. The item classifier may include machine learning-based classifiers 410, rule-based classifiers 406, attribute-based classifiers 408, etc. In some embodiments, an item classifier may be assigned a weight based on training data. The weight may indicate a confidence score associated with the classifier's prediction on a particular item or group of items.

Machine learning-based classifiers 410 may refer to an item classifier that may be trained to predict item types for given items. Rule-based classifiers 406 may refer to an item classifier that adopts one or more classification rules (e.g., whitelist and blacklist rules) to predict item types for given items. Attribute-based classifiers 408 may refer to an item classifier that make predictions based on the presence of certain attributes or attribute values. For example, item classification using attribute-based classifiers 408 may be implemented by executing an attribute and/or value-based classification rule. With respect to rule-based classifiers 406 and/or attribute-based classifiers 408, a classification rule refers to a procedure in which individual items are each assigned to one of the item groups (e.g., item types).

In some embodiments, the classification rule may be created using regular expressions. For example, the classification rule may include a whitelist rule, a blacklist rule, and an attribute and/or attribute value-based classification rules. The whitelist rule may define that a particular item type may be assigned to an item, for example, having a particular item title. Similarly, the blacklist rule may define that a particular item type may not be assigned to an item, for example, having a particular item title.

For example, the whitelist rule for an item type "rings" may include :rings? ---> rings, wedding bands? ----> rings, diamond.*trio sets? ---> rings, diamond.*bridal ---> rings, diamond.*bands? ---> rings, sterling silver.*bands? ---> rings. This exemplary rule means that if an item title contains "ring" or "rings", then it is of item type "rings". Accordingly, the following items may be classified as the type of "rings": Always & Forever Platinaire Diamond Accent Ring, ¼ Carat T.W. Diamond Semi-Eternity Ring in 10kt White Gold, Miabella Round Diamond Accent Fashion Ring in 10kt White Gold. Thus, this would enable the analysts to write classification rules in more efficiently manner. In some embodiments, the regular expression matching may be case insensitive and that each regular expression may start on a word boundary. For example, "rings?" may not match "earrings" in item titles.

In some embodiments, the attribute and/or attribute value-based classification rule may indicate a relationship between an attribute and/or attribute value of an item and the item type corresponding to the item. For example, these classification rules may include a list of brand names together with associated with item types. These rules may be useful for certain item types, such as books, movies, and/or music that share the same title (e.g., "The Hunger Games"). In these instances, attribute- and/or value-based classifiers may apply rules involving attributes (e.g., if a product item has the attribute "ISBN" then its product type is "Books") or values (e.g., if the "Brand Name" attribute of a product item has value "Apple", then the type can only be "laptop", "phone", etc.).

As illustrated in FIG. 4, machine learning-based classifiers 410 may classify item 420 based on the title of the item 420 contained in the item record. For example, the title may be processed using various machine learning-based classifiers, such as naive Bayes, k-nearest neighbor (KNN), Perceptron, support vector machines (SVM), and logistic regression classifiers. In some embodiments, to build machine learning-based classifiers 410, training data may be created by manually labeling items.

A naive Bayes classifier is conceptually simple, easy to implement, and provides a fast classification. This classifier may handle text data. In some embodiments, k-grams in a title with k=1, 2, 3 may be used as possible features. For example, bigrams (i.e., two-word phrases) may be used as features. Given a product title t, the naive Bayes classifier may compute $P(c|t)$, the probability that t has the product type c for all product types, and then return multiple item types c where $P(c|T)$ exceeds a pre-specified threshold as candidate product types for title t. In general, suppose $f_1, \ldots, f_n$ be the (bigram) features derived from title t, then the naive Bayes classifier computes $p(c|t)=P(t|c)P(c)/P(t)$, where P(t|c) is estimated as P(f1|c)P(f2|c) . . . P(fn|c), assuming independence among the features. The probabilities P(fi|c) and P(c) can be estimated from the training data, while the probability P(t) can be ignored (as they are the same for all c).

A KNN classifier assigns a product type to an item based on the types of similar items. The KNN classifier requires essentially no training, and achieves surprisingly good results. In particular, the KNN classifier may guarantee that no incoming product item that already appears in the training data would be classified incorrectly. Specifically, given a product item x, the KNN classifier determines that the top k items in the training data that are most similar to x. The KNN classifier may rank the product types of these top k items based on their frequency, and then return the ranked list as the classifier's prediction for item x. The similarity between two items is the weighted Jaccard measure between their titles (e.g., treated as sets of words), where the weights are computed based on the term frequency (TF) and inverse document frequency (IDF) of the words in the titles.

A Perceptron classifier uses a single-layer perceptron model with multiple outputs, and uses stochastic gradient descent for fast model training Here the Perceptron classifier also uses words in the titles as features, but perform feature selection using information gain by selecting the top 100 features based on information gain for each item type. The Perceptron classifier may be trained fast with simple updates.

Rule-based classifiers 406 may include whitelist rules 424 and blacklist rules 426, which may be generated using a guidance and/or format. For example, the guidance may include the following examples. Take product type "television" for example. Analysts could easily create simple rules using regular expressions such as "televisions?","tvs?", "hdtv", "lcd.*tv", "led.*tv", etc. These rules may cover items of "television" type (provided that item titles have reasonable quality; as a counter example of a low-quality title, it is nearly impossible to classify the item "ss glx gio s5660"). Thus, at the start, when there was no training data, the analysts may be asked to create many basic rules based on their knowledge of the product types, to jump start the classification system 400.

Rule-based classifiers 406 may not need training data. In some embodiments, if the training data is too little, rule-based classifiers 406 may be misled. In some embodiments, classification rules may provide an effective and quick way to handle corner cases (e.g., new items from a vendor) or cases that prevent machine learning-based classifiers 410 from improvement (e.g., further increasing the precision of item classifications). In these instances, to achieve higher precision, the classification system 400 may enable analysis platform 410 to generate blacklist rules that modify the coverage of a whitelist rule. For example, the whitelist rule of "rings? ! rings" classifies an item of "Bluecell 50pcs 25MM Split Key Chain Ring Connector Keychain with Nickel Plated" as a type of ring, while this item is clearly not a ring. To address this incorrectness, analysis platform 410 may facilitate an analyst to write a blacklist rule "key chain? ! NOT rings".

In some embodiments, item 420 may match multiple whitelist rules. For example, "Lucky Line 71101 Key Ring" matches both "rings? ! rings" and "key.*rings rightarrow key chains". To address this situation, the classification system 400 may first apply whitelist rules 424. Suppose that S represents the set of product types predicted by whitelist rules 424 that match item 420. Then, blacklist rules 426 may be applied to modify the set S. In these instances, the classification system 400 may rank the types in S in a decreasing likelihood of being the correct type for item 420. One observation may indicate: if the set of words (in the title of item 420) matched by a rule $R_1$ subsumes the set of words matched by a rule $R_2$, then $R_1$ is more likely than $R_2$ to have the correct item type. For example, consider "Lucky Line 71101 Key Ring". A rule $R_1$ for "key chains" may match "Key" and "Ring", and a rule $R_2$ for "rings" may match just "Ring". In this case, the correct type is indeed "key chains".

Another observation may indicate: in an item title (e.g., "LaCuisine 18pcMicrowave Cookware Set KTMW18"), phrases that appear early in the title (e.g., Lacuisine, 18pc) tend to describe the product, whereas phrases that appear later in the title (e.g., Cookware Set) tend to refer to the product itself. In turn, if a rule matches phrases later in the title, it is more likely to refer to the correct product type. Suppose that $w_i^e$ represents the position in the title where the very first phrase that matches rule $R_i$ starts, and let we be the position in the title where the very last phrase that matches rule $R_i$ ends. Suppose $t_i$ to be the product types predicted by $R_i$. As illustrated in the following algorithms, a ranked list of item types in S may be generated by applying the rule-based classifier to product item 420.

If $W_1^s = W_2^s$ & $W_1^e = W_2^e$, then rank($t_1$)=rank($t_2$), if $W_1^e \leq W_2^s$, then rank($t_2$)≥rank($t_1$), If $W_1^s \leq W_2^s$ & $W_2^e$ & $W_1^e \leq W_2^e$, then rank($T_2$)≥rank($T_1$), If $W_1^s \leq W_2^s$ & $W_1^e \geq W_2^e$, then rank ($t_1$)≥rank($t_2$).

As illustrated in FIG. 4, machine learning-based classifiers 408, attribute-based attributes 408, and rule-based classifiers 406 may classify item 420 to output ranked lists of predicted item types. These ranked lists may be transmitted to voting master 412 configured to aggregates these ranked lists to produce a combined ranked list. In some embodiments, voting master 412 may aggregate the ranked list using various methods, for example, majority voting or weighted voting. A majority voting method may rank item types based on their frequency in the classifiers' output. A weighted voting method may take into account the weights of the classifiers (assigned manually by the developer or learned via training data).

Once voting master 412 has produced a combined ranked list of product types, filter 414 may apply a set of rules to the output item types to generate classification results 422. Filter 414 may control the output of machine learning-based classifiers 410 as well as voting master 412 to avoid undesired cases in classification results 422. For example, machine learning-based classifiers 410 may keep misclassifying "necklace pendant" as of type "necklace" (because the training data include many items of type "necklace" that do contain the word "necklace"). As a result, voting master 412 may produce "necklace" as the output type for "necklace pendant". Analysis platform 418 may enable analysts to address this case by adding a rule such as "pendant! NOT necklace" to filter 414. As for another example, classification system 400 may keep classifying some non-food item into "pizza". As a quick fix, analysis platform 418 may enable the analysts to add a rule defining that an item is not classified as a pizza if a title does not contain the word of "pizza".

In some embodiments, at least a portion of classification results 422 may be retrieved to form samples 424, which are provided to a crowdsourcing computer network 426 for evaluation. This evaluation may detect cases where the output is not sufficiently accurate so that the analysts and developers associated with classification system 400 may improve accuracy of classification system 400. This evaluation may also ensure that accuracy deterioration may be detected earlier. The accuracy deterioration may refer to accurate cases that stop being so due to a change in incoming data, underlying algorithms, and/or crowdsourcing computer network 426.

In some embodiments, classification system 400 may sample over classification results 422 using a confidence level of 95% with an interval 2-3 to determine the number of items. In some embodiments, classification system 400 may sample over classification results 422 by selecting a fixed number of items for evaluation. After the evaluation, crowdsourcing computer network 426 may determine crowd results 428 and/or provide crowd results 428 to analysis platform 418 for further analysis. For example, crowd results 428 may indicate that a determined type of a pair (e.g., h item, type i) is not correct and therefore is flagged. Analysis platform 418 may enable analysts to verify whether crowd results 428 are correctly determined.

In some embodiment, analysis platform 418 may also examine the crowd results 428 to detect patterns of incorrectness associated with crowd results 428, and then write whitelist and blacklist rules (e.g., a new rule 432) to correct the incorrectness. For example, the analysts may manually correct the types of problematic classifications (e.g., a relabeled item record 434). In some embodiments, analysis platform 418 may provide a report 430, which may include the detected patterns for the developers associated with classification system 400 to debug and adjust classification system 400. In some embodiments, analysis platform 418 may update rule-based classifiers 406 by incorporating new rule 432 into rule-based classifiers 406 and provide relabeled item record 434 as training data to train machine learning-based classifiers 410.

Figure 5:
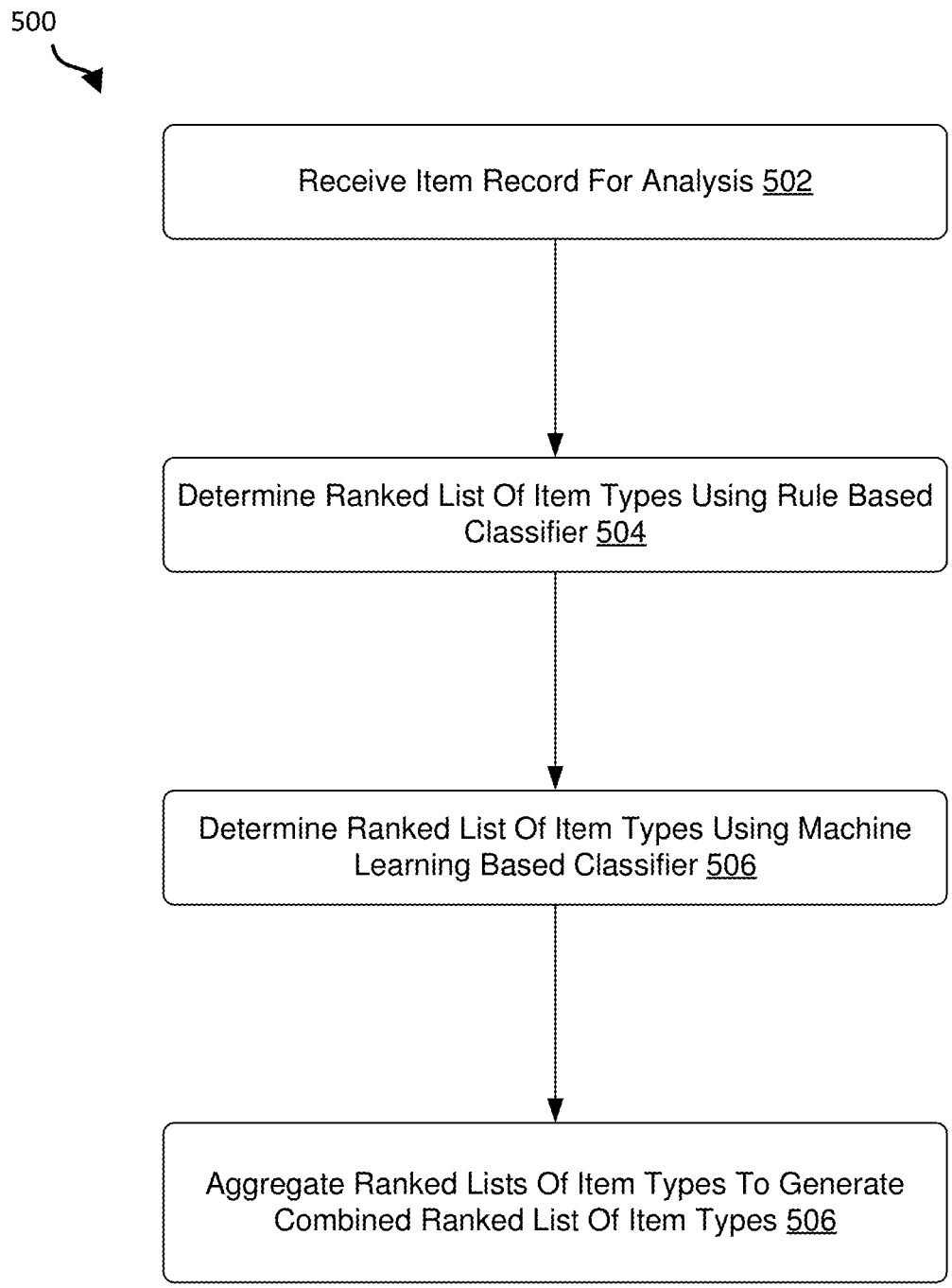
FIG. 5 is a process flow diagram of a method for item classification using rule-based classifiers in accordance with an embodiment of the present disclosure.

FIG. 5 is a process flow diagram of a method 500 for item classification using rule-based classifiers in accordance with an embodiment of the present disclosure. Example process 500 includes one or more operations, actions, or functions. Although illustrated as discrete blocks, various blocks may be divided into additional blocks, combined into fewer blocks, or eliminated, depending on the desired implementation. Process 500 may be implemented by one or more processors including, for example, one or more components of classification system 400. For illustrative purposes, the operations described below are performed by one or more processors of classification system 400 as shown in FIG. 4 and/or the processor 202 of the computing device 200 as shown in FIG. 2.

At 502, one or more processors of classification system 400 may receive an item record associated with item 420. Item record 402 may include a description of item 420. In some embodiments, the classification system 400 may initialize at least a portion of multiple classifiers of classification system 400 using a set of training item records and a basic rule. In these instances, one or more processors of classification system 400 may analyze item record 402 to determine an initial item type based on an initial classification rule, and provide item record 402 to multiple classifiers of classification system 400 in response to a determination that a confidence score associated with the initial item type and item 420 is greater than a predetermined threshold, or the initial classification rule is not related to item record 402.

At 504, the one or more processors of classification system 400 may generate a first ranked list of item types based on item record 402 using rule-based classifiers 406. In some embodiments, the one or more processors of classification system 400 may apply whitelist rules 424 and blacklist rules 426 to the item record to obtain the first ranked list of item types. In these instances, whitelist rules 424 may define that item 420 belongs to a first item type, and blacklist rules 426 may define that item 420 does not belong to a second item type different from the first item type.

At 506, the one or more processors of classification system 400 may generate a second ranked list of item types based on item record 402 using machine learning-based classifiers 410. In some embodiments, machine learning-based classifiers 410 may include at least one of a naive Bayes classifier, a KNN classifier, or a Perceptron classifier.

At 508, the one or more processors of classification system 400 may aggregate the first ranked list of item types and the second ranked list of item types to generate a combined ranked list of item types. In some embodiments, the one or more processors of classification system 400 may provide at least a portion of the combined ranked list of item types to crowdsourcing computer network 426 for evaluation. In these instances, the at least a portion of the combined ranked list of item types may include a determined item type of item 420. The one or more processors of classification system 400 may determine, based on the evaluation, that the determined item type is not acceptable, and then cause generation of a new rule and an updated item type by an analyst. For example, analysis platform 418 may enable analysts to generate new rule 432, which may also be incorporated into rule-based classifiers 406.

In some embodiments, the one or more processors of classification system 400 may update rule-based classifiers 406 by incorporating new rule 432 into rule-based classifiers 406. The one or more processors of classification system 400 may also train machine learning-based classifiers using the relabeled item record 434, which may include the relabeled item type and the description of item 420.

In some embodiments, the one or more processors of classification system 400 determine a third ranked list of item types based on item record 402 using attribute-based classifiers 408. In these instances, the one or more processors of classification system 400 may then aggregate the first ranked list of item types, the second ranked list of item types, and the third ranked list of item types into the combined ranked list of item types.

Figure 6:
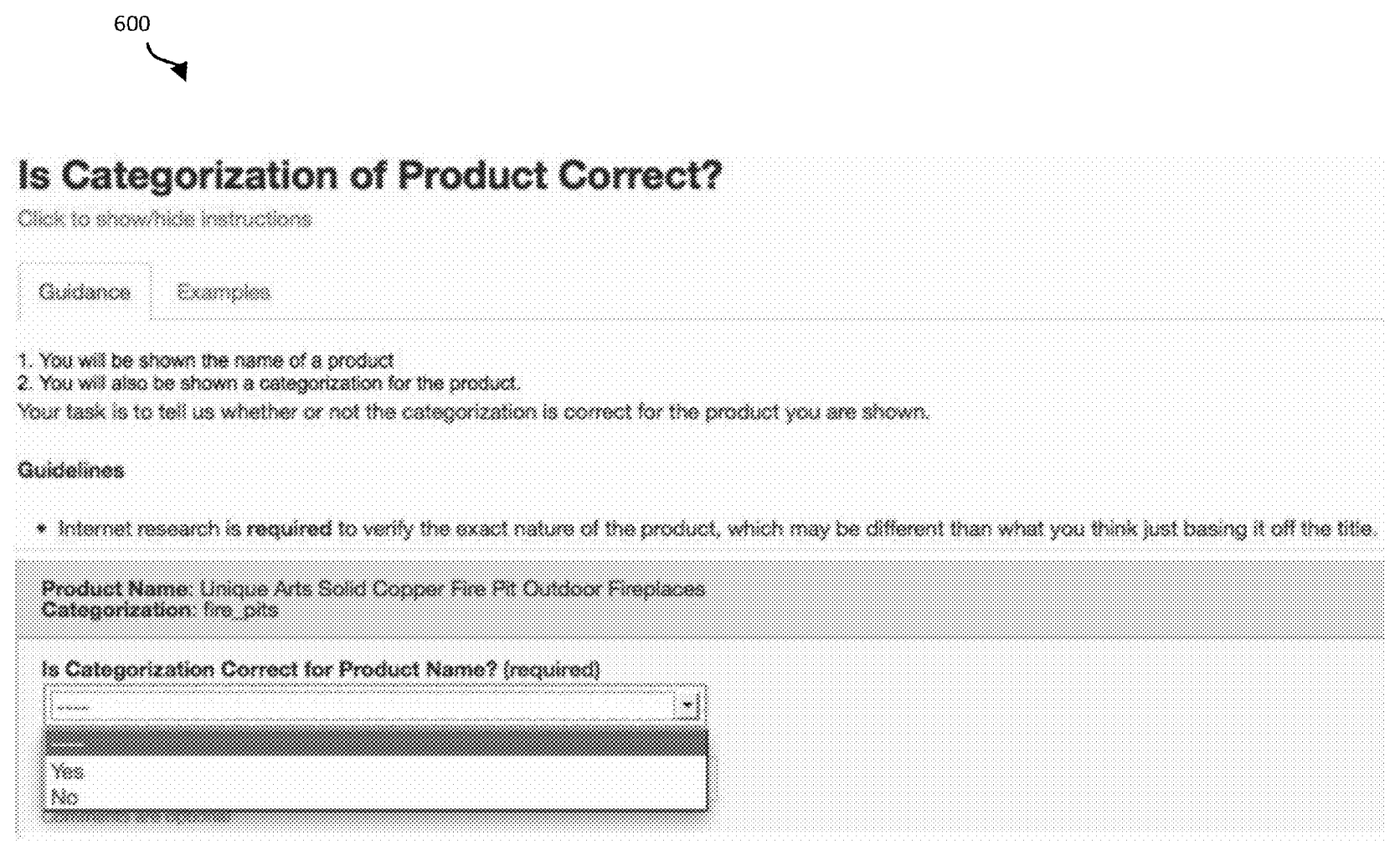

In some embodiments, the one or more processors of classification system 400 may filter the combined ranked list of item types to generate a filtered list using a blacklist rule, and provide a representation of the filtered list. The representation may be then sampled for evaluation by crowdsourcing computer network 426 and/or for analysis by analysis platform 418. During the evaluation, crowdsourcing works may be presented with various questions associated with item classification, and FIG. 6 shows a sample questions.

Figure 7:
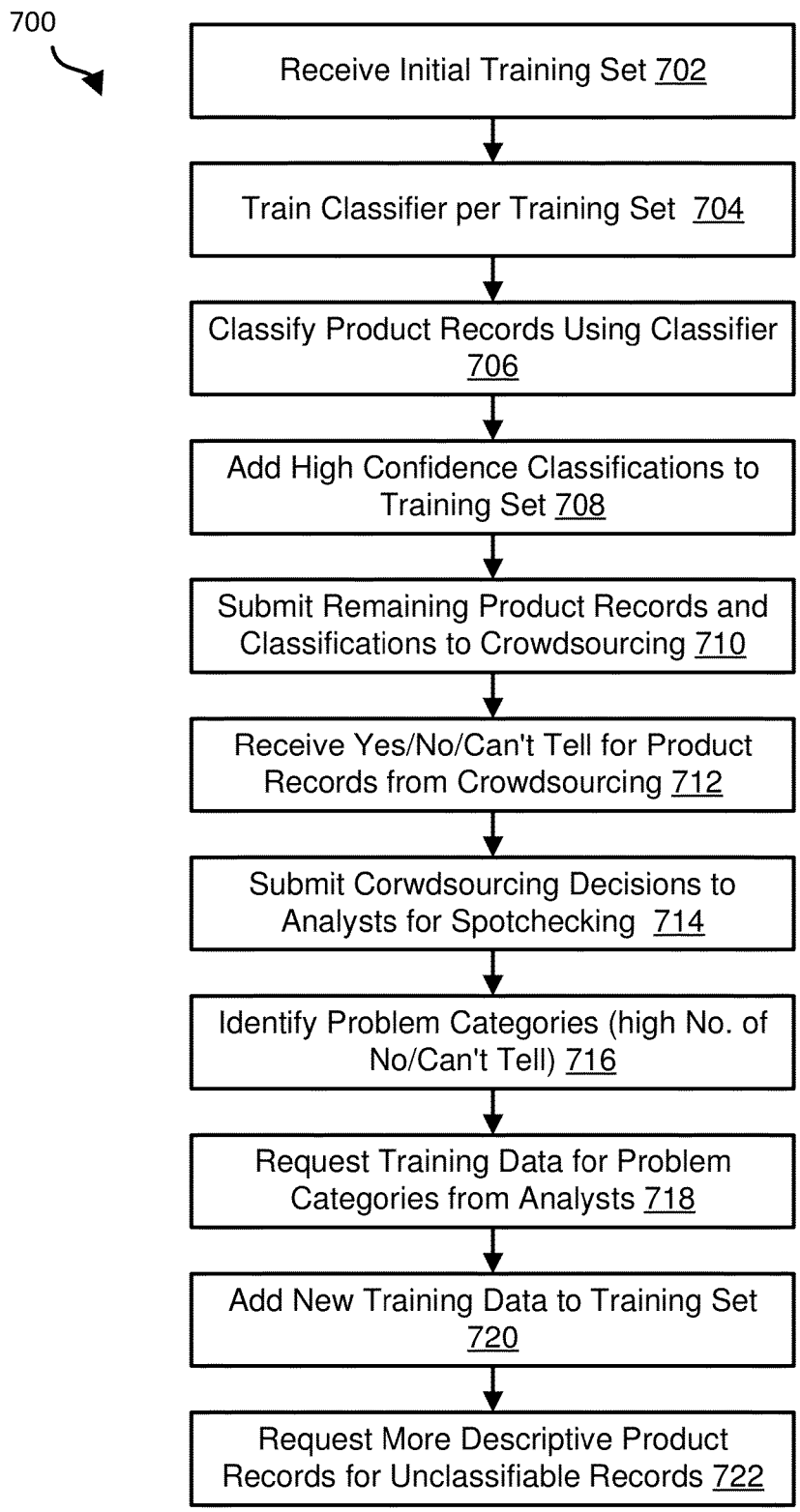
FIG. 7 is a process flow diagram of a method for training a classification model in accordance with an embodiment of the present disclosure.

FIG. 7 illustrates a method 700 that may be executed by a server system 102 with interaction with some or all of the analyst workstations 104, crowdsourcing workstations 106, and merchant workstations 108.

The method 700 may include receiving 702 an initial training set. The initial training set may be generated manually according to human judgment or retrieved from an existing set of training data. As noted above, the entries of the training set may include [text]->[classification value] pairings, where [text] is any text that might be found in a classified record and [classification value] is any node of a taxonomy, such as category, subcategory, or entity classification to which the text corresponds. A classifier model may then be trained 704 using the training set. Training 704 may include training using any machine learning algorithm known in the art. Some or all records in a record corpus may then be classified 706 using the classifier model as trained 704. Application of the classifier model to input records may also be performed according to any machine learning algorithm known in the art.

As mentioned above, the machine learning algorithm may associate a confidence score with a classification output as a result of the classification 706 of records. Those classifications with a confidence score above a specified threshold may be added 708 to the training set. A classification may include [text]->[classification value] pairs suitable for addition as an entry to the training set. In some embodiments, this step is omitted in order to prevent self-reinforcing errors.

Some or all of the classifications that are not identified as high confidence may then be submitted 710 to a crowdsourcing forum for validation. This may include distributing the some or all of the classifications to participants in a crowdsourcing forum, such as by transmitting classifications to crowdsourcing workstations 106 for display thereon. Classifications and requests to validate them may be transmitted to the crowdsourcing workstations 106 directly or by way of a module or entity coordinating distribution of tasks to a crowdsourcing forum.

For some or all of the classifications submitted 710 to the crowdsourcing forum, a validation decision may be received 712 from the crowdsourcing forum. A validation decision for a classification may be a simple yes or no indicating that the classification was correct or incorrect, respectively. A validation decision may also include a substitute value for the [classification value] field of a received classification. In some embodiments, a validation decision may also include an "unclear" option indicating that the record of a classification does not include sufficient information to determine whether or not the classification value corresponding thereto is correct.

In some embodiments, some or all of the validation decisions received 712 from the crowdsourcing forum may be submitted 714 to one or more analysts to verify that validation decisions are accurate. This may include transmitting some or all of the validations decisions to one or more analyst workstations 104. The validation decisions may then be displayed on the analyst workstation, possibly with a prompt to approve or disapprove of the validation decision and/or provide an alternative classification value.

Feedback may then be received by the analyst workstations 104 and transmitted to the crowdsourcing forum for presentation on a crowdsourcing workstation 106, either directly or by way of the server system 102. As noted above, an identifier associated with a classification or validation decision may be used to route feedback to an appropriate participant, e.g. the crowdsourcing workstation 106 of the appropriate participant. The feedback may then be displayed on the workstation 106 of the appropriate participant to provide education and training In some embodiments, classifications validated by the crowdsourcing forum may be added to the training set. In some embodiments, records found to be valid by the crowdsourcing forum may be excluded from subsequent classification in subsequent iterations of the method 700 unless implicated by changes to the training set as discussed below. In a like manner, high confidence classifications output from the classification model may likewise be excluded from being classified again unless implicated by changes to the training set.

The method 700 may further include automatically identifying 716 one or both of classification values and categories of classification values having a large number or proportion of classifications marked as invalid by the crowdsourcing forum. As noted above, a classification value may be identified as a problem area if a threshold-exceeding percentage of classifications from the classifier model including the classification value have been marked as invalid by the crowdsourcing forum. As also noted, a category may be identified 416 as a problem category if a threshold-exceeding percentage of classifications from the classifier model including classification values belonging to that category have been marked as invalid. Alternatively, a category may be identified 716 as a problem if a first threshold-exceeding percentage of classification values belonging to that category have a second threshold-exceeding percentage of classifications including classification values belonging to that category marked as invalid by the crowdsourcing forum. The first and second thresholds may be equal or unequal.

The method 700 may further include requesting 718 training data for the identified 716 classification values or categories. Requesting training data 718 may include automatically transmitting requests to one or more analyst workstations 104 to generate training data with respect to one or more identified 716 problem classification values or categories. The requests may then be displayed on the analyst workstations 104, such as a prompt or task to provide training data. An analyst workstation 104 may then receive input of training data, and transmit this training data to a server system 102. The request to provide training data may include some or all of the supplementary data noted above with respect to the system 300.

Training data received from an analyst, such as from an analyst workstation 104, may then be added 720 to the training set. In some embodiments, validation decisions from the crowdsourcing forum that include a substitute classification value or that validated a classification from the classifier model may also be added 720 to the training set. In some embodiments, the machine learning algorithm may use training data including negative classifications, e.g. [text]->[NOT classification value] (where [text] is found [classification value] should not be assigned]. In such embodiments, validations decisions that find a classification to be incorrect may also be added to the training data set in this format.

As noted above with respect to FIG. 3, where an analyst determines that a record includes too few terms or unneeded terms, the analyst may invoke transmission of a request 722 from the analyst workstation 104 to a merchant workstation 108 to modify the record by adding or removing terms.

Although the steps of the method 700 are listed in sequence one or more of the steps may be performed in parallel. Likewise, the method 700 may be performed in multiple iterations such that one iteration commences before all steps of the method 700 have been completed.

Figure 8:
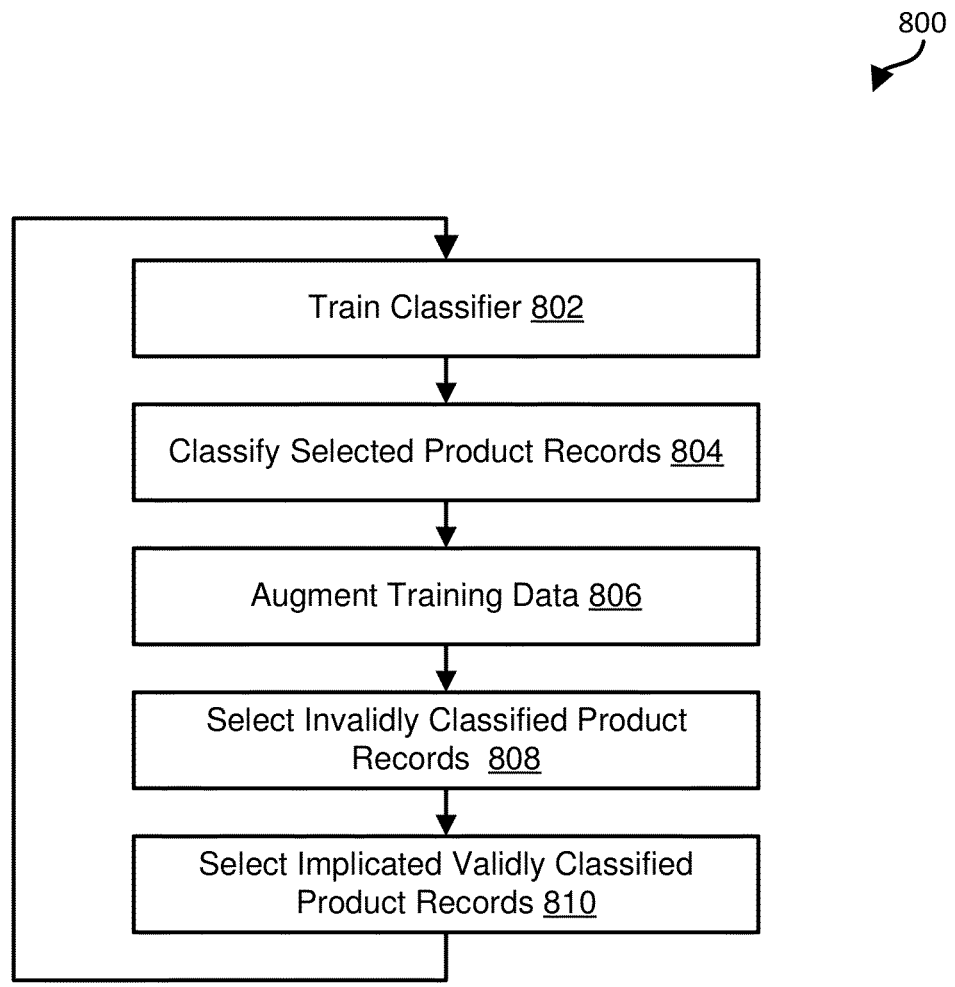
FIG. 8 is a process flow diagram of a method for iteratively training a classification model in accordance with an embodiment of the present disclosure.

Referring to FIG. 8, the method 700 of FIG. 7 may be repeated as additional training data is created as described above. For example, an iterative method 800 may be performed that includes training 802 a classifier model using training data, classifying 804 a selected portion of product records using the classifier model, and augmenting 806 training data as described above with respect to the system 300 and method 700. In particular, augmenting 806 training data may include training data received from an analyst workstation 104, crowdsourcing forum, or high confidence data output from a classifier model as described above.

The method 800 may additionally include preparing for a subsequent iteration of steps 802-806. For example, the method 800 may include selecting 808 some or all of the product records that were previously marked as invalid by the crowdsourcing community. In some embodiments, all product records marked as incorrectly classified may be classified again based on an augmented set of training data. In other embodiments, only those product records for which new training data implicating the product record has been received are selected 808. For example, in some embodiments, a product record may be classified according to a category and/or subcategory and these classifications may be confirmed. However, a subsequent classification to a subcategory or entity in a taxonomy may be marked as invalid. Accordingly, training data implicating such a record may be training data relating to a category or subcategory to which the product record has been accurately assigned and/or relating to a subcategory or entity belonging to a category or subcategory to which the product record has been accurately assigned.

The method 800 may further include selecting 810 a plurality of product records that were previously accurately classified 804 by the classifier model and that are implicated by the augmented 806 training data, e.g. training data having as the [classification value] corresponding to the [classification value] accurately associated therewith in a previous iteration. The manner in which a product record is determined to be implicated by added training data may be the same as for the step of selecting 808 implicated invalidated classifications. Selecting product records that were validly classified for reclassification may be performed to ensure that modifications to the classification model due to the augmented training data does not result in subsequent incorrect classification of these product records. In some embodiments, only a sampling, e.g. a random sample, of accurately classified product records implicated by the new training data are selected 810.

The method 800 may then be repeated by training 802 the classifier using the augmented 806 training data and classifying 804 selected product records selected according to one or both of steps 808 and 810.

The present disclosure may be embodied in other specific forms without departing from its spirit or essential characteristics. The described embodiments are to be considered in all respects only as illustrative, and not restrictive. The scope of the present disclosure is, therefore, indicated by the appended claims, rather than by the foregoing description. All changes which come within the meaning and range of equivalency of the claims are to be embraced within their scope.

The invention claimed is:

1. A computer-implemented method for product classification, the method comprising:
  receiving, by one or more processors of a server, a product record associated with a product, the product record comprising a description of the product;
  generating, by the one or more processors, a first ranked list of product types based on the product record using a plurality of rule-based classifiers;
  generating, by the one or more processors, a second ranked list of product types based on the product record using a plurality of machine learning-based classifiers;
  aggregating, by the one or more processors, the first ranked list of product types and the second ranked list of product types to generate a combined ranked list of product types;
  providing the description of the product and a portion of the combined ranked list of product types to a crowdsourcing computer network for evaluation; and
  returning, from the crowdsourcing computer network, a validation decision, wherein:
    when the crowdsourcing computer network determines that a type of the product is correct, the validation decision indicates that the type of the product is correct;
    when the crowdsourcing computer network determines that the type of the product is not correct, the validation decision indicates that the type of the product is not correct; and
    when the crowdsourcing computer network determines that the description of the product is insufficient to accurately judge whether the type of the product is correct, the validation decision indicates that the type of the product is unclear.

2. The method of claim 1, wherein the generating, by the one or more processors, the first ranked list of product types based on the product record using the plurality of rule-based classifiers comprises: applying a whitelist rule and a blacklist rule to the product record to obtain the first ranked list of product types, the whitelist rule defining that the product belongs to a first product type, the blacklist rule defining that the product does not belong to a second product type different from the first product type.

3. The method of claim 1 wherein at least a portion of the combined ranked list of product types comprises a determined product type of the product; and wherein the method further comprises:
  determining, based on the evaluation, that the determined product type is not acceptable; and
  causing generation of a new rule and an updated product type by an analyst.

4. The method of claim 3, further comprising:
  updating at least one classifier of the plurality of rule-based classifiers using the new rule; and
  training at least one classifier of the plurality of machine learning-based classifiers using the updated product type and the description of the product.

5. The method of claim 1, further comprising: determining a third ranked list of product types based on the product record using a plurality of attribute-based classifiers.

6. The method of claim 5, wherein the aggregating, by the one or more processors, the first ranked list of product types and the second ranked list of product types into the combined ranked list of product types comprises: aggregating the first ranked list of product types, the second ranked list of product types, and the third ranked list of product types into the combined ranked list of product types.

7. The method of claim 1, further comprising: initializing at least a portion of the plurality of rule-based classifiers and the plurality of machine learning-based classifiers using a set of training product records and a basic rule.

8. The method of claim 1, further comprising:
  analyzing the product record to determine an initial product type based on an initial classification rule;
  in response to a determination that: a confidence score associated with the initial product type and the product is greater than a predetermined threshold, providing the product record to the plurality of rule-based classifiers;
  in response to a determination that: a confidence score associated with the initial product type and the product is greater than a predetermined threshold, providing the product record to the plurality of machine learning-based classifiers;

in response to a determination that: the initial classification rule is not related to the product record, providing the product record to the plurality of rule-based classifiers; and in response to a determination that: the initial classification rule is not related to the product record, providing the product record to the plurality of machine learning-based classifiers.

9. The method of claim 1, wherein the plurality of machine learning-based classifiers comprises at least one of a naive Bayes classifier, a k-Nearest Neighbors (KNN) classifier, or a Perceptron classifier.

10. The method of claim 1 comprising filtering the combined ranked list of product types to generate a filtered list using a blacklist rule.

11. One or more non-transitory computer-readable media storing computer-executable instructions that, when executed on one or more processors, cause the one or more processors to perform acts comprising:

receiving a product record associated with a product, the product record comprising a description of the product;

classifying the product based on the product record using a plurality of rule-based classifiers to generate a first ranked list of product types, including applying a whitelist rule and a blacklist rule to the product record to obtain the first ranked list of product types, wherein the whitelist rule defines that the product belongs to a first product type and the blacklist rule defines that the product does not belong to a second product type different from the first product type;

classifying the product based on the product record using a plurality of attribute-based classifiers to generate a second ranked list of product types;

combining the first ranked list of product types and the second ranked list of product types to generate a combined ranked list of product types;

providing at least a portion of the combined ranked list of product types to a crowdsourcing computer network for evaluation; and returning, from the crowdsourcing computer network, a validation decision, wherein:

when the crowdsourcing computer network determines that a type of the product is correct, the validation decision indicates that the type of the product is correct;

when the crowdsourcinq computer network determines that the type of the product is not correct, the validation decision indicates that the type of the product is not correct; and when the crowdsourcing computer network determines that the description of the product is insufficient to accurately judge whether the type of the product is correct, the validation decision indicates that the type of the product is unclear.

12. The one or more non-transitory computer-readable media of claim 11, wherein the classifying of the product based on the product record using a plurality of rule-based classifiers to generate the first ranked list of product types comprises:

applying an attribute value-based classification rule.

13. The one or more non-transitory computer-readable media of claim 11, wherein:

the at least the portion of the combined ranked list of product types comprises a determined product type of the product; and when the validation decision is that the determined product type is not correct, the acts further comprise causing generation of a new rule and an updated product type by an analyst.

14. The one or more non-transitory computer-readable media of claim 13, wherein the acts further comprise:

updating at least one classifier of the plurality of rule-based classifiers using the new rule; and training at least one classifier of a plurality of machine learning-based classifiers using the updated product type and the description of the product.

15. The one or more non-transitory computer-readable media of claim 11, wherein:

the acts further comprise: determining a third ranked list of product types based on the product record using a plurality of machine learning-based classifiers; and the combining of the first ranked list of product types and the second ranked list of product types into the combined ranked list of product types comprises:

aggregating the first ranked list of product types, the second ranked list of product types, and the third ranked list of product types into the combined ranked list of product types.

16. An apparatus comprising:

a memory configured to store data and one or more sets of instructions; and one or more processors coupled to the memory, the one or more processors configured to execute the one or more sets of instructions and perform operations comprising:

receiving an item record associated with an item, the item record comprising a description of the item;

generating a first ranked list of item types based on the item record using a plurality of rule-based classifiers including applying a blacklist rule to the item record to obtain the first ranked list of item types, wherein the blacklist rule defines that the item does not belong to a second item type different from a first item type;

generating a second ranked list of item types based on the item record using a plurality of machine learning-based classifiers; and aggregating the first ranked list of item types and the second ranked list of item types to generate a combined ranked list of item types;

providing the description of the item and at least a portion of the combined ranked list of item types to a crowdsourcinq computer network for evaluation; and returning, from the crowdsourcing computer network, a validation decision, wherein:

when the crowdsourcinq computer network determines that a type of the item is correct, the validation decision indicates that the type of the item is correct;

when the crowdsourcing computer network determines that the type of the item is not correct, the validation decision indicates that the type of the item is not correct; and when the crowdsourcing computer network determines that the description of the item is insufficient to accurately judge whether the type of the item is correct, the validation decision indicates that the type of the item is unclear.

17. The apparatus of claim 16, wherein the generating of the first ranked list of item types based on the item record using the plurality of rule-based classifiers comprises: applying a whitelist rule to the item record to obtain the first ranked list of item types, the whitelist rule defining that the item belongs to the first item type.

18. The apparatus of claim 16, wherein the plurality of machine learning-based classifiers comprises a naive Bayes classifier, a k-Nearest Neighbors (KNN) classifier, and a Perceptron classifier.

19. The apparatus of claim 16, wherein the operations further comprise:
   determining a third ranked list of item types based on the item record using a plurality of attribute-based classifiers.

20. The apparatus of claim 19, wherein the aggregating of the first ranked list of item types and the second ranked list of item types into the combined ranked list of item types comprises: aggregating the first ranked list of item types, the second ranked list of item types, and the third ranked list of item types into the combined ranked list of item types.

* * * * *